F. L. CONE.
NUT TAPPING MACHINE.
APPLICATION FILED JULY 5, 1917.

1,325,888.

Patented Dec. 23, 1919.
7 SHEETS—SHEET 1.

Fig. 1.

Inventor:
Frank L. Cone
by Hughes, Brown, Grundy & May
Attorneys.

F. L. CONE.
NUT TAPPING MACHINE.
APPLICATION FILED JULY 5, 1917.

1,325,888.

Patented Dec. 23, 1919.
7 SHEETS—SHEET 3.

Inventor:
Frank L. Cone
by Wright Brown Quinby May
Attorneys.

F. L. CONE.
NUT TAPPING MACHINE.
APPLICATION FILED JULY 5, 1917.

1,325,888.

Patented Dec. 23, 1919.

Inventor:
Frank L. Cone
Attorneys.

UNITED STATES PATENT OFFICE.

FRANK L. CONE, OF WINDSOR, VERMONT.

NUT-TAPPING MACHINE.

1,325,888.     Specification of Letters Patent.     Patented Dec. 23, 1919.

Application filed July 5, 1917. Serial No. 178,565.

*To all whom it may concern:*

Be it known that I, FRANK L. CONE, a citizen of the United States, residing at Windsor, in the county of Windsor and State of Vermont, have invented new and useful Improvements in Nut-Tapping Machines, of which the following is a specification.

This invention relates to a machine for tapping nuts or other detachable or separate blanks which may be presented successively to the tapping mechanism. The object of the invention is to provide a mechanism by which the nuts or the like may be internally threaded expeditiously and economically; which is simple in construction, accurate in operation and easy to keep in repair, and which is unitary in construction, so that a plurality of such units or mechanisms may be provided in a single machine and operated from a single driving device.

Considered in its simplest form, the invention comprises a tap having a shank of sufficient length to receive thereon one or more tapped blanks, and mechanism coöperating therewith by which the blanks are fed successively to the cutting end of the tap, and, after traversing the length of the shank, are discharged automatically and successively from the rear end thereof. In the embodiment of the invention which I have selected for illustration as the best form now known to me, the tap is straight or rectilinear, and is reciprocated lengthwise into and out of engagement with its driving spindle, so that, when the end of the shank is disengaged from the spindle, a threaded or tapped blank is discharged from such end. Each unit of the machine may be provided with any suitable number of taps and associated driving spindles, so that a plurality of blanks may be simultaneously tapped, and hence, by multiplying the number of units, a large number of blanks may be simultaneously tapped automatically.

On the drawings, I have not attempted to show a complete machine, that is, a machine having a full complement or definite number of units, but have illustrated a section of a machine having two complete units and a portion of a third unit.

Referring to the drawings,—

The principle, on which the mechanism hereinafter described in detail is operated, is as follows. The straight tap is normally engaged at its rear end with a ratchet chuck on the driving spindle, and by a feeder a blank is thrust longitudinally of the tap from a raceway until it is engaged with the cutting end of the tap. The rotation of the tap in cutting the thread feeds the nut, which is held against rotation, longitudinally of the tap. The nut is fed until it has passed longitudinally to the unthreaded portion of the shank. It being assumed that on the shank there are now a sufficient number of blanks, a pusher thrusts the tap longitudinally out of engagement with and away from the chuck on the spindle. The blank on the rear extremity of the shank is now capable of dropping from the end thereof when the pusher is retracted. Thereupon another nut advanced to engage the operative end of the tap, and the tap is returned into engagement with the spindle chuck.

Figure 6:
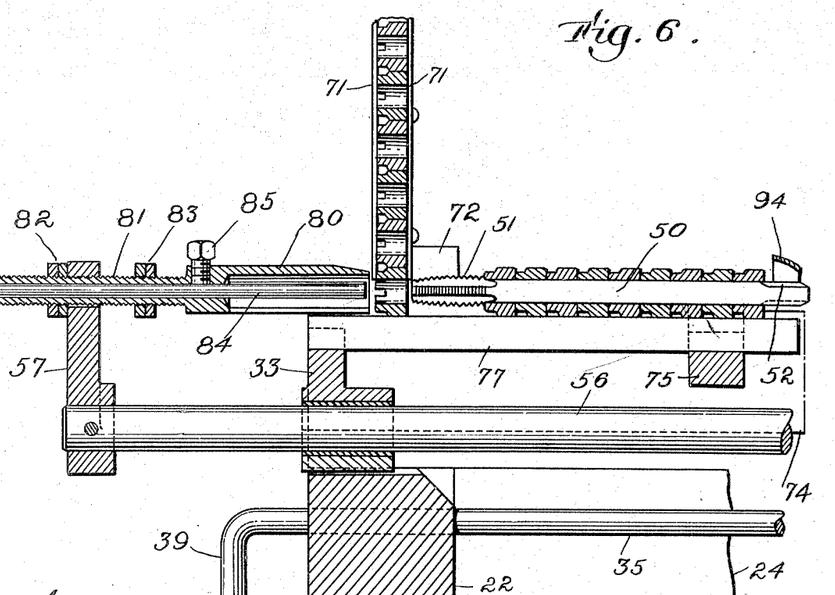
Figs. 6 and 7 respectively illustrate the front and rear portions in longitudinal vertical section in the same plane.
Figure 7:
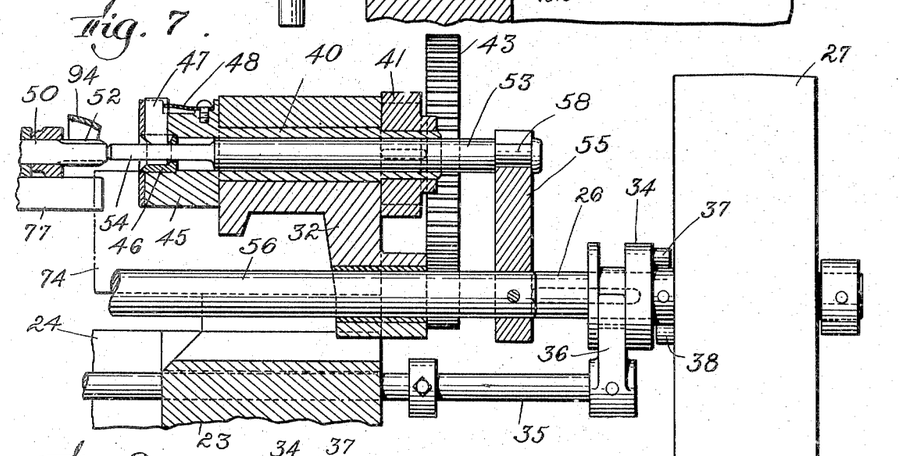
Figure 8:
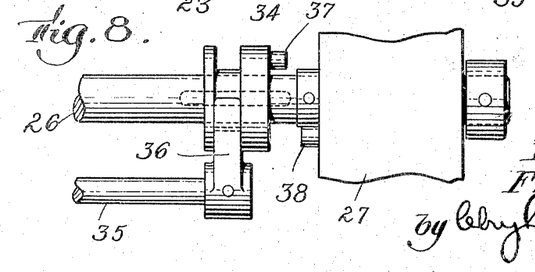
Fig. 8 illustrates the clutch mechanism for the main drive pulley of one of the units.

Proceeding now to a more detailed description, the machine is provided with a suitable bed or body 20, which may consist of a hollow casting if desired, and which at its sides is supported on legs or uprights 21. This bed or body is of sufficient size to support any number of units that may be desired. In Figs. 6 and 7, the front and rear walls of the bed are indicated respectively at 22 and 23, these walls being connected at the sides by walls of which one is indicated in dotted lines in Fig. 1 at 24. Additional braces may extend between the front and rear wall at intervals to strengthen the bed or body if it be found desirable.

Figure 1:
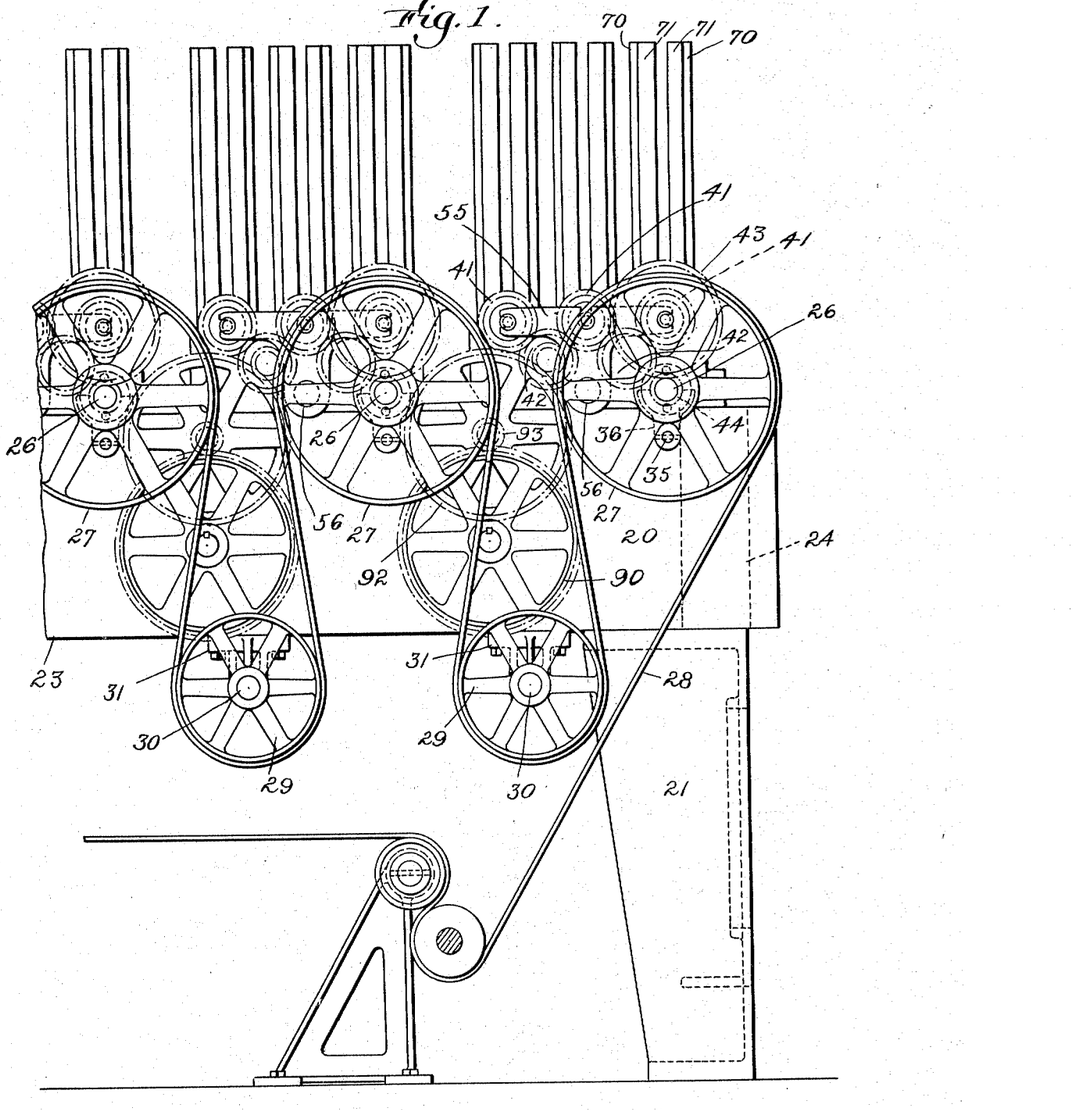
Figure 1 represents what I may term the rear end of a machine embodying the invention.
Figure 2:
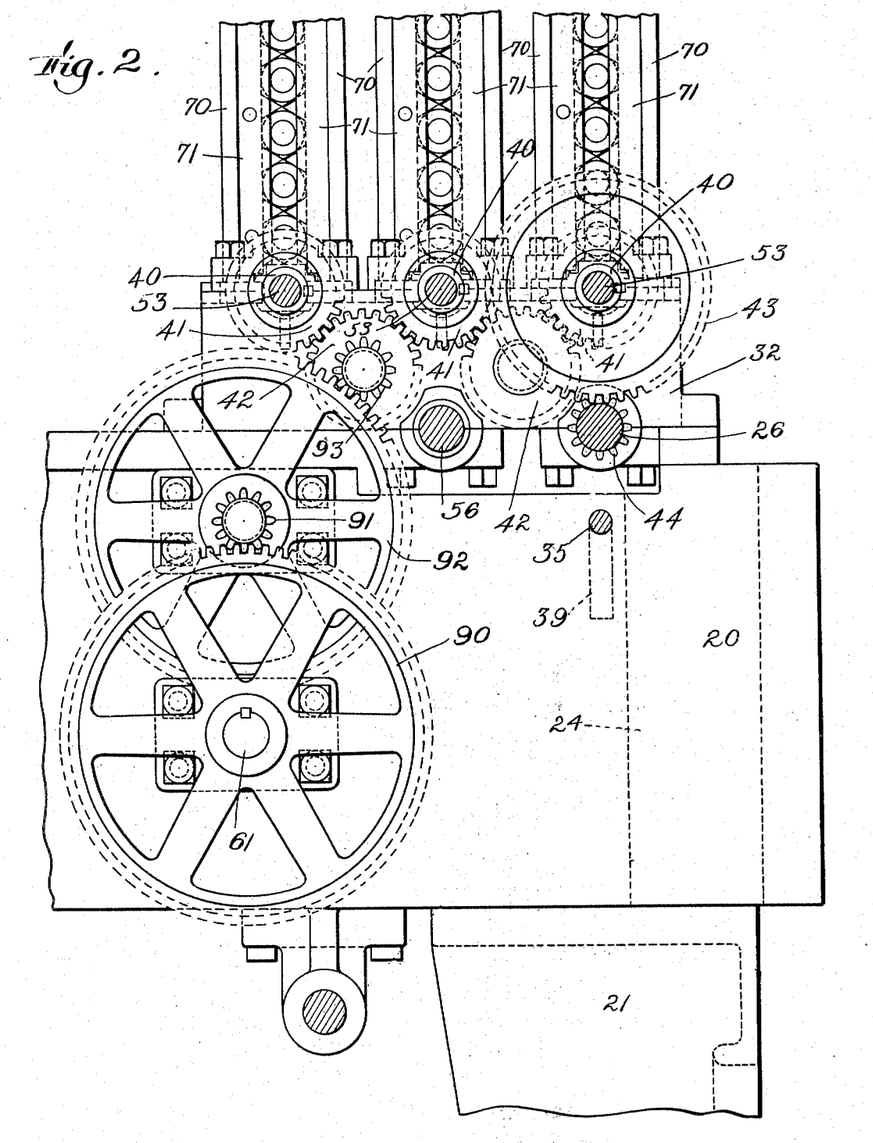
Fig. 2 illustrates one unit of the machine in rear elevation and partially in section.
Figure 3:
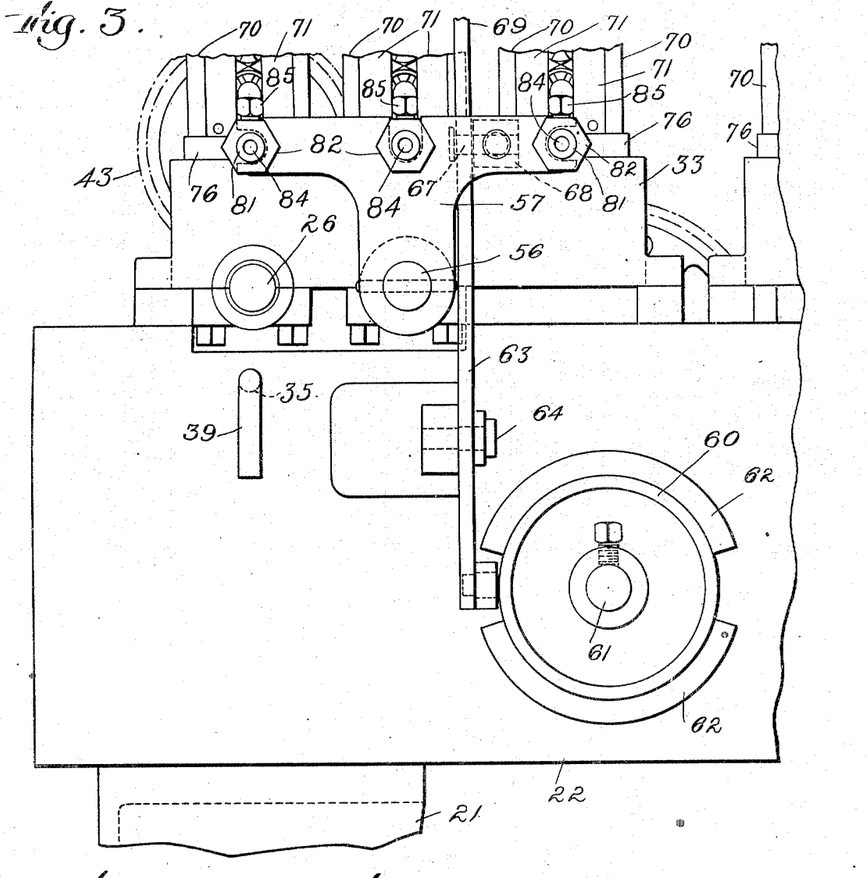
Fig. 3 illustrates in front elevation one of such units, the blank-feeding chutes being broken off at the top.
Figure 4:
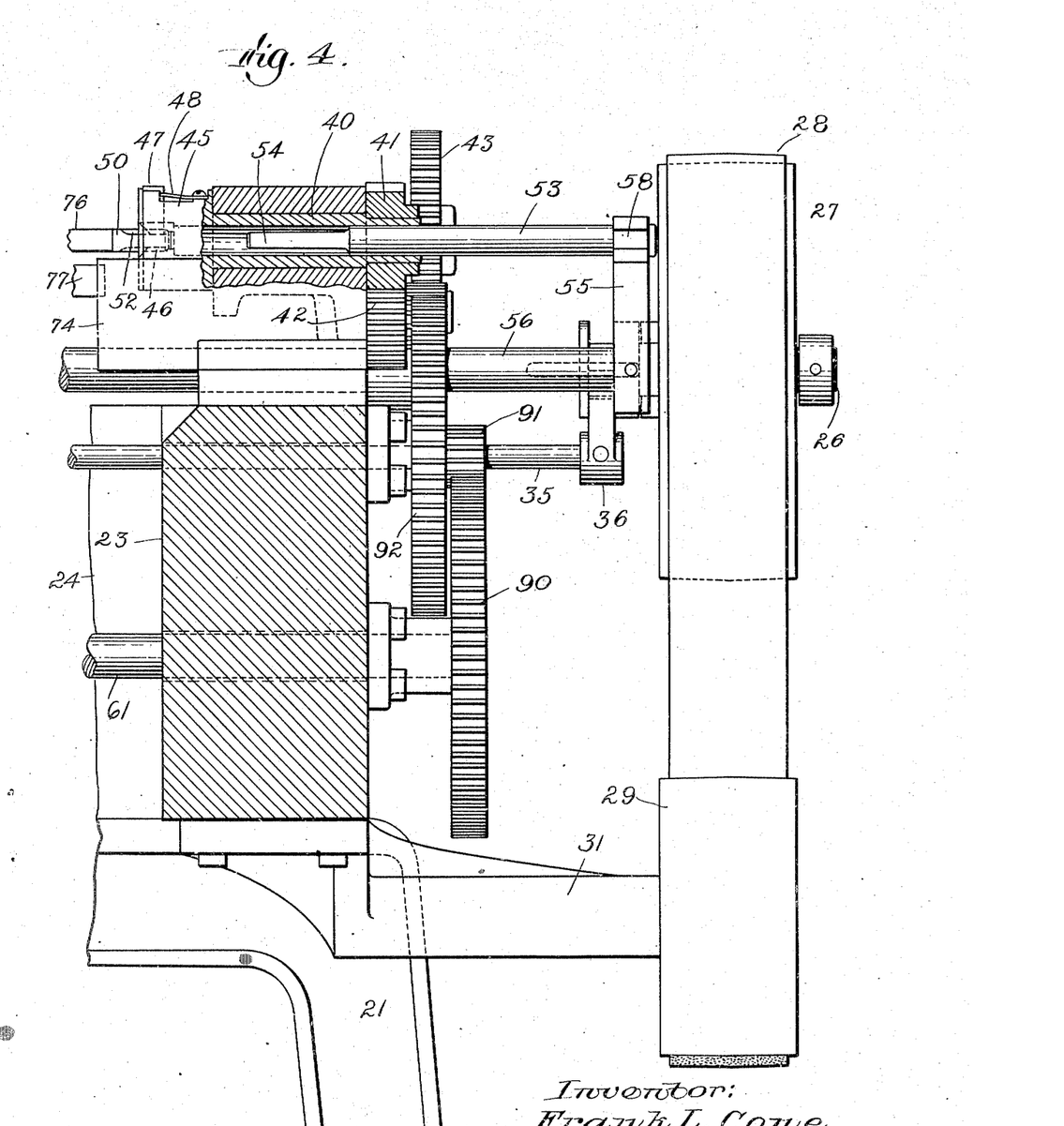
Fig. 4 illustrates in longitudinal vertical section one of the units.

I will now describe one unit of the machine, which, as previously stated, includes three taps and associated mechanism. Such unit comprises a supporting frame on the bed, three spindles and gearing for rotating them, three raceways for the blanks, and three guideways for the blanks being operated upon, a pusher frame with devices for reciprocating the taps and feeding the blanks from the raceway thereto, a feed shaft, gearing for rotating the shaft, a cam drum on the feed shaft, associated cam-actuated mechanism for reciprocating the pusher frame, and a clutch-controlled main driving shaft for transmitting power to the said gearing. Referring first to Figs. 1 and 2, the main driving shaft for each unit is indicated at 26 and it extends longitudinally of the bed, that is, parallel with the side walls thereof. It is equipped with a pulley 27 which is loose thereon but which may be clutched thereto as hereinafter described. A single belt 28, driven from any suitable source of power, is utilized to drive the pulleys 27 of all of the units, there being for this purpose idler pulleys 29 journaled on stud shafts 30 mounted in bearings 31 on the under side of the rear wall 23 of the bed, as best shown in Figs. 1 and 4. The driving shaft 26, as best shown in Figs. 2 and 3, is journaled in suitable bearings afforded on the under side of two uprights 32, 33, of a frame or casting supported upon the front and rear walls of the bed. The clutch for connecting the pulley 27 to the shaft 26 is indicated at 34 in Fig. 7, and it is splined upon the shaft so that it may be moved longitudinally thereof by a bar 35 having a yoke 36 engaging a circumferential groove in the clutch. Any suitable form of clutch mechanism may be utilized, but I have shown the clutch as having a pin 37 which may engage a complemental pin 38 on the pulley. The rod 35 extends through the rear and front walls of the bed, and, at a point in front of the front wall, is bent downwardly to provide a handle 39 by which it may be engaged and operated by the attendant. There is one of these clutch-operating devices for each unit of the machine. From the main or drive shaft 26 of each unit, power is transmitted to the tap-operating spindles and other operative mechanisms of the unit. As indicated in Fig. 2, each unit is provided with three spindles, each of which is indicated at 40. They are all arranged in the same horizontal plane and are journaled on the rear upright 32. As shown in Fig. 4, each spindle 40 is hollow, and on its reduced rear end is provided with a gear or pinion 41. Engaged with each adjacent pair of pinions 41, there is a pinion 42, as shown in Fig. 2, so that all three spindles will be rotated synchronously. Formed on or secured to the pinion 41 of the first spindle on the right-hand side in Fig. 2, there is a gear 43 which intermeshes with and is driven by a pinion 44 on the drive shaft 26. Thus from the said main or drive shaft 26 power is imparted to the three spindles to effect their rotation. As best shown in Figs. 4 and 7, each spindle is provided at its front end with an automatic chuck 45 with which the associated tap may be engaged and disengaged. The chuck comprises a body in which is inserted a hardened steel bushing 46, there being a radially sliding pawl or latch 47 which is normally pressed inwardly by a spring 48. The tap, as will be explained, is so constructed that it may be moved longitudinally to enter the chuck and its rear end has ratchet teeth to be engaged by the pawl or latch 47 so that the said tap may be rotated by the spindle.

Figure 9:
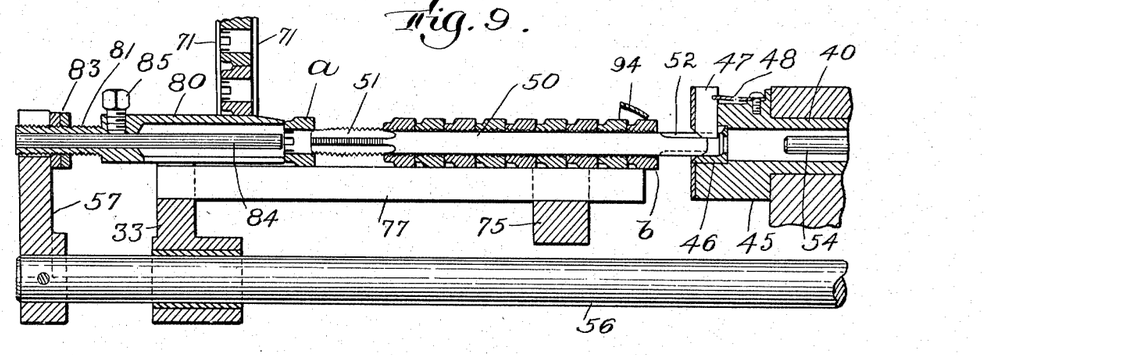
Figs. 9 to 12 inclusive illustrate the tap and its associated operating mechanisms in the various positions they assume during a complete cycle of operations in which one blank is tapped and a tapped blank is discharged.
Figure 10:
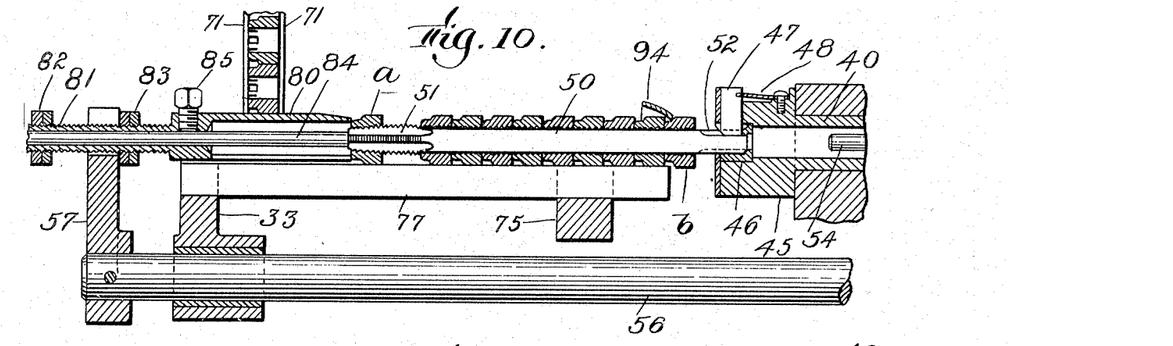
Figures 11, 12:
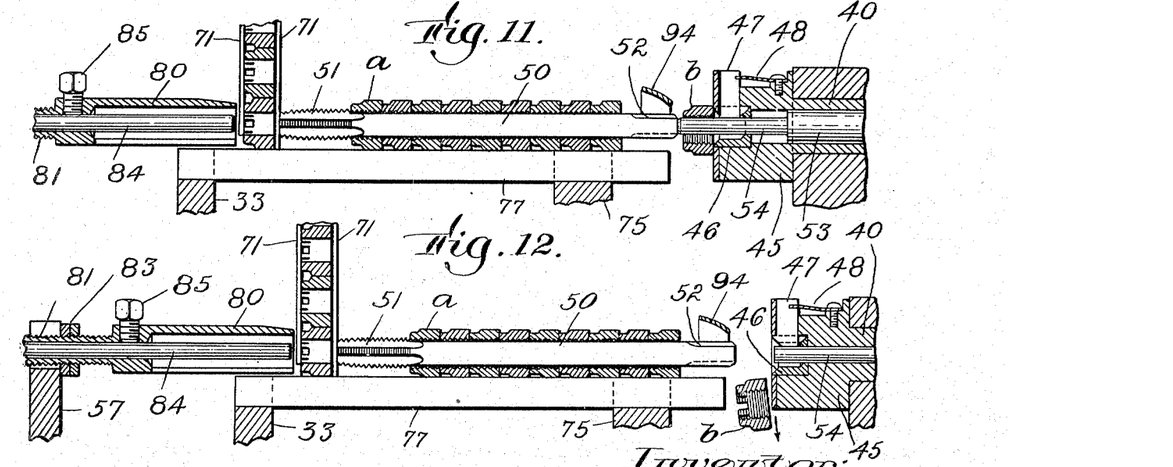

In each unit there are three taps each indicated at 50. As shown in Fig. 6, for example, the tap is provided at its front end with a cutting head 51 which is tapered at its extremity. The unthreaded shank of the tap is long enough to accommodate thereon a plurality of tapped blanks, and at the rear end of the shank there are formed longitudinal ratchet teeth 52 to be engaged by the spring-pressed latch or pawl in the associated chuck. When the tap is disengaged from the chuck, it is sustained in position and prevented from lateral dislocation by the tapped blanks which are strung thereon, as will be explained. The taps are disengaged from their respective chucks by pushers that are mounted upon a sliding frame. Each pusher is indicated at 53 and it consists of a rod which extends into the rear end of the spindle 40 and has a reduced front end 54 which can be projected through the bushing into engagement with the rear end of the tap so as to force the tap axially away and to space it from the chuck as indicated in Figs. 9, 10 and 11. When the pushers have been withdrawn, the taps may be caused to reënter and become engaged with their respective chucks. The pushers are attached to a T-shaped bracket 55, the downwardly projecting portion of which is secured to a longitudinal bar 56. This bar is arranged to slide in bearings afforded by the uprights 32, 33, of the frame of the unit, and has on its front extremity a similar T-shaped bracket 57 for a purpose to be explained. The two brackets 55, 57, are respectively pinned to the slide bar 56, and constitute therewith the sliding pusher frame. The pushers 53 have reduced headed rear ends 58 which are located in U-shaped sockets in the bracket 55.

Figure 5:
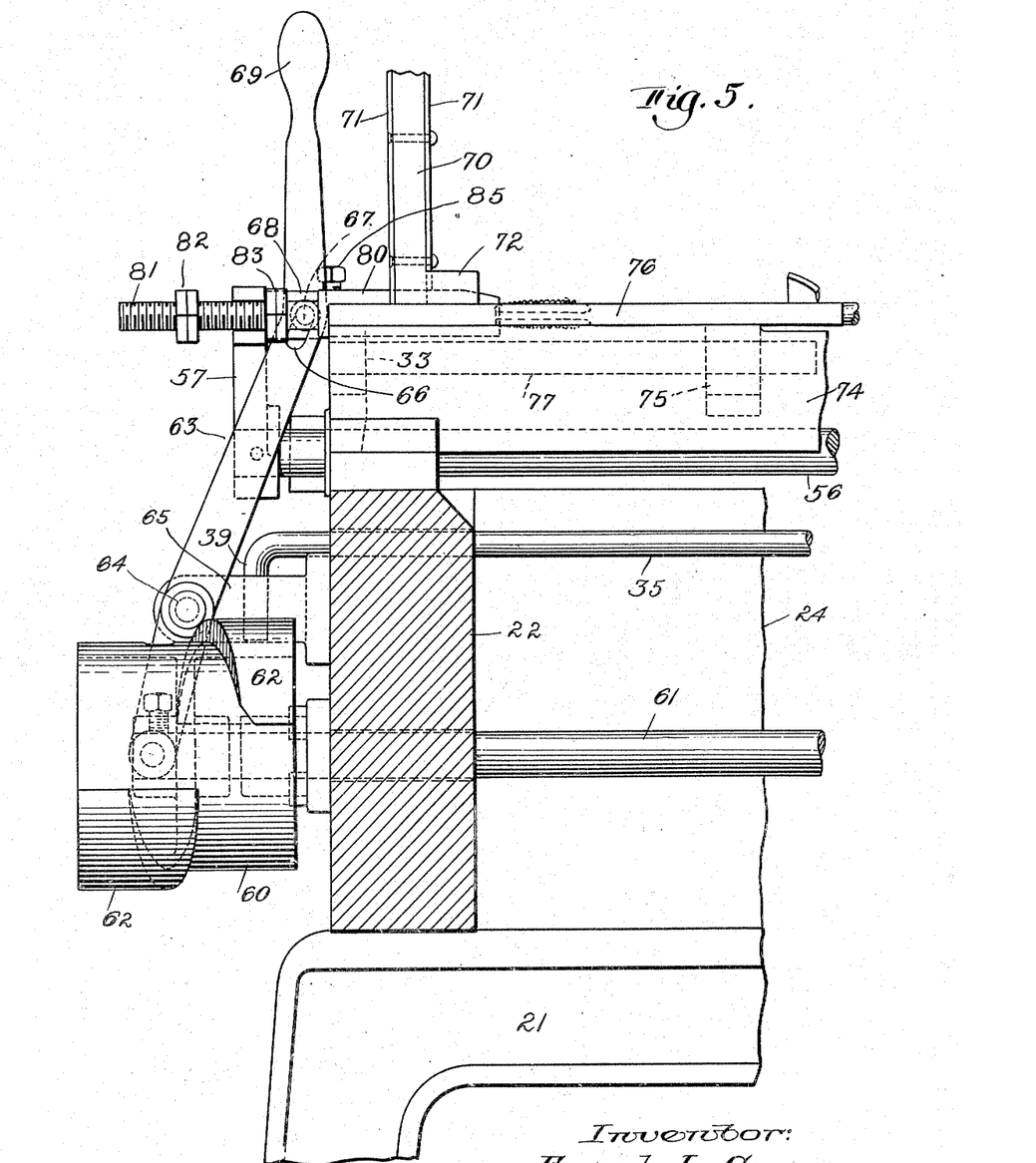
Fig. 5 represents in side elevation the front portion of such unit.

The mechanism, by which the pusher frame is reciprocated, receives its power indirectly from the main shaft 26. This mechanism comprises in part a cam drum 60 mounted upon a feed shaft 61, as best shown in Figs. 3 and 5. Upon the drum are placed cams 62, 62, of suitable conformation to effect the purpose desired. Said cams operate a lever 63 which is pivoted between its ends upon a stud 64 supported by a bracket 65 attached to the front wall 22 of the body. The upper arm of the lever is slotted as at 66 to receive a pin 67 projecting laterally from a block 68 attached to the rear side of the bracket 57. When the drum makes one full rotation, the lever 63 is oscillated first in one direction and then in the other to advance and retract the pusher frame, as will be readily understood. The lever 63 is provided with an upward extension 69 which constitutes a handle by which it may be rocked manually when desired.

Figure 13:
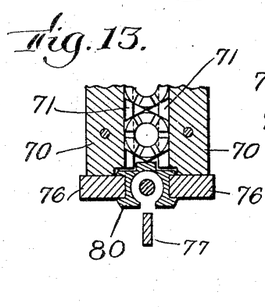
Figs. 13 and 14 illustrate vertical transverse sections through one of the blank-feeding chutes, the former showing the blank feeder and top pusher in cross section.
Figure 14:
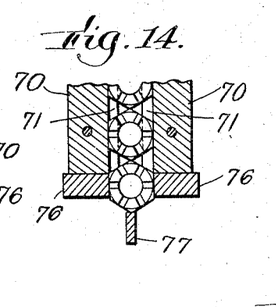
Figure 15:
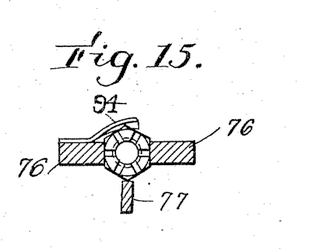
Fig. 15 illustrates a detent for engaging one of the tapped blanks when the tap is thrust forward, to facilitate the discharge of the rear tapped blank.

The pusher frame is provided with pushers which feed the blanks to the taps and which also return the taps into engagement with the chucks. Before describing these latter pushers, however, I will describe the chutes and raceways for the blanks. The raceways for each unit are equal in number to the taps and they consist of upright parallel bars 70 spaced far enough apart to receive between them the diametrically opposite sides of a blank. In Figs. 13 and 14, these blanks are illustrated as hexagonal, and they are arranged vertically one above the other between the bars 70 of the raceway. To hold the nuts against axial movement in either direction, each raceway is provided on the front and rear thereof with guide strips 71. The bars 70 of the raceways are provided with lugs at their lower ends as at 72 which may be bolted or otherwise secured upon bars 76 (to be described) secured to the uprights 32. Extending from the upright 32 to the upright 33, there are parallel side bars 74 (cast therewith and thus constituting therewith the supporting frame hereinbefore referred to), which bars 74 are connected intermediate of their ends by a cross bar 75, also cast therewith, see Fig. 6. Supported by the upright 33 and by the cross bar 75 of each supporting frame, there are three pairs of parallel horizontal guide bars 76 which terminate at a distance from the corresponding chuck spindle a little greater than the thickness (i. e. axial length) of one of the tapped blanks. These bars are arranged as shown in Figs. 13 and 14, so as to receive between them a blank which is to be tapped. At a point below each pair of parallel guide bars, there is a third guide bar 77 upon which the corners of the blanks rest, said guide bars 77 being supported by the upright 33 and by the cross bar 75. Each bar 77 has its rear end flush with the rear ends of the guide bars 76, and all three bars constitute a guideway for the blanks. When a tapped blank rides off the end of the guide bar 77, it drops into the body of the machine. As the blanks descend one by one down the raceway by gravity, the lowest blank may be engaged by a feeding pusher and moved rearwardly to engage the operative end of the tap. The feeding pushers are shown in Figs. 6, and 9 to 13 inclusive. Each pusher consists of a slide 80, the sides of which are grooved so that it will slide between the guide bars 76. Each pusher is provided with a threaded shank 81 which extends through an aperture in the bracket 57, and on the threaded shank there are set nuts 82, 83, which may be adjusted toward and from each other and which permit, if desired, a limited movement of the pusher frame in either direction before causing a movement of the pushers 80. Each pusher is hollow and is provided with an adjustable stop pin 84 secured in place by a set screw 85 and arranged in axial alinement with the associated tap 50. When the pusher frame is moved to the right in Fig. 6, each feeding pusher 80 will engage a blank and move it to the right into engagement with the operative end of the tap. Thereafter the tap and the blank will both be moved to the right until the rear toothed end of the tap is thrust into the corresponding rotating spindle chuck. During the initial rotation of the tap, the pusher frame continues its movement at slow speed to the right until the end of the pin 84 engages the end of the tap and until the nut has advanced far enough on to the operative end of the tap to cause it to be fed thereafter lengthwise of the tap by the rotation of the latter. The blank in each case is held against rotation by the parallel guide bars 76, and the tap is prevented from separating from the chuck by the pin 84.

The cams, which effect the movement of the pusher frame, are illustrated only conventionally, but it will be understood that they are in practice so formed and timed as to cause the proper automatic operation of the pusher frame. The feed cam shaft 61 is provided on its rear end with a gear 90 engaging with and actuated by a gear 91 formed on or secured to a large gear 92 intermeshing with and driven by a pinion 93 on one of the gears 42 previously described. In Fig. 2, it will be observed that the pinion 93 is secured to the left-hand gear 42. Through the train of gearing just described, the speed of rotation of the cam shaft is properly correlated to the speed of rotation of the tap-driving spindles.

The operation of the machine will be easily understood, particularly when considered in connection with Figs. 9 to 12 inclusive. In Fig. 9, a blank $a$ has been engaged by the blank-feeding pusher 80 and has been thrust into engagement with the cutting end of the tap. The tap has been moved to the right until its rear or toothed end has been engaged with the chuck of its associated spindle. The pusher frame continues to move to the right, forcing the blank $a$ in that direction, until the pusher pin 84 engages the end of the tap and holds it firmly against dislocation in the chuck. The parts remain in this position, the tap continuing to rotate, until the blank $a$ has been threaded and has been advanced to the position shown in Fig. 11. On the shank tap there are shown nine threaded blanks, the rear one of which is indicated at $b$. After the blank $a$ has been completely tapped, the pusher frame is moved to the left until it occupies the position shown in Fig. 11. As the pusher frame moves to the left, the reduced end 54 of the pusher 53 engages the tap 52 and thrusts it to the left until its front end is close to the corresponding or associated raceway. As the tap is moved to the left, the rear blank $b$ is held stationary by a spring detent 94 attached to one of the guide bars 76, and the pusher 54 enters the aperture thereof as shown in Fig. 11. Thereafter, when the pusher frame is again moved to the right, the pusher 54 is withdrawn from the blank $b$, permitting it to drop into the hollow body of the machine, as illustrated in Fig. 12. When the parts have reached the position shown in Fig. 12, the pusher frame is then moved to the right to cause the parts to assume the position already described in connection with Fig. 9. In starting the operation of the machine, it is necessary to first supply each tap with a full complement of blanks in order that the tap may be held, or sustained in position, as it is thus sustained only by the blanks (which are in turn supported by the guideway) when the tap has been disengaged and separated from the chuck.

From the foregoing description it will be understood, of course, that as each pusher frame is actuated, it of course causes the operation of the three sets of pushers thereon, so that, for each unit, three blanks will be tapped for each complete rotation of the feed shaft thereof. By equipping a machine with a number of units, it will be apparent that a very great production is secured.

From the foregoing description and explanation it will be apparent that numerous changes in the construction of the machine may be made without departing from the spirit and scope of the invention as set forth in the claims. Any suitable mechanism may be employed for effecting a relative rotation of the tap and the blank, or for effecting the relative longitudinal reciprocation of the tap and the chuck or spindle. I should not regard it as a departure from my invention if the blank were rotated and the tap held stationary, or the spindle reciprocated and the tap held axially stationary, the essential features being the separation of the tap and the chuck to permit the discharge of the blank from the rear end of the tap.

Having thus explained the nature of my said invention and described a way of making and using the same, without attempting to set forth all of the forms in which it may be made or all of the modes of its use, what I claim is:

1. A tapping machine comprising a tap having cutters at its front end, a guideway for guiding a blank longitudinally of the tap and holding it against rotation, a chuck adapted to engage the rear end of the tap, means for rotating the tap and mechanism for automatically and alternately engaging and separating said tap and said chuck.

2. A tapping machine comprising a rectilinear tap having cutters at its front end, a spindle held against axial movement, means for feeding blanks successively to the front end of the tap, and means arranged to engage the opposite ends of the tap for automatically and intermittently separating the tap axially from the spindle to permit the discharge of tapped blanks successively from the rear end of said tap, and moving the tap axially into reëngagement with said spindle.

3. A tapping machine comprising a rectilinear tap having cutters at one end, means for successively feeding blanks to the front end of said tap, means for effecting the successive discharge of tapped blanks from the rear end of said tap, a stationary guideway for holding the blanks against rotation, and means for effecting an intermittent relative rotation of the tap and the blank being tapped, said tap being supported by said guideway and the blanks therein, during the discharge of a tapped blank.

4. A tapping machine comprising a tap consisting of a shank capable of receiving a plurality of blanks thereon and having cutters at its front end, a rotary axially immovable spindle, and means for axially reciprocating said tap into engagement with and away from said spindle, said tap being supported and positioned by tapped blanks on the shank when said tap is separated from said spindle.

5. A tapping machine comprising a tap, an axially immovable chuck adapted to receive the shank of said tap, and means for engaging the opposite ends axially of said tap and moving said tap into and out of engagement with said chuck.

6. A tapping machine comprising a raceway for blanks, a tap, a stationary guideway for blanks arranged parallel with the axis of the chuck, means for feeding the blanks successively from the raceway along said guides toward the tap, an axially immovable rotary spindle, mechanism for effecting a relative rotation of the said guideway and said spindle, and mechanism for effecting an axial movement of said tap into and out of engagement with said spindle, whereby said tap is intermittently separated from said spindle to permit the discharge of tapped blanks from the rear end of said tap.

7. A tapping machine comprising a horizontal guideway for blanks, a vertical raceway arranged to deliver blanks to said guideway, a tap located within said guideway, an axially immovable spindle adapted to receive the shank of the tap, a pusher for feeding the blanks axially to the tap, and a pusher for separating said tap from said spindle.

8. A tapping machine comprising a tap, a spindle having a chuck to engage and rotate said tap, a reciprocatory frame, and pushers thereon to insert the shank of the tap into and separate it from said chuck.

9. A tapping machine comprising a stationary guideway arranged to support a plurality of axially alined blanks, a tap having a shank adapted to project through said blanks on the guideway and to be supported thereby, a chuck, and mechanism for reciprocating said tap axially into and away from said chuck.

10. A tapping machine comprising a stationary horizontal guideway arranged to support a plurality of axially alined blanks, a tap having a shank adapted to project through said blanks and to be supported thereby, a hollow spindle, a chuck thereon, a pusher arranged to be projected through said spindle to eject the tap from the chuck, a pusher arranged to return said tap to said chuck, and mechanism for automatically actuating said pushers.

11. A tapping machine comprising a guideway arranged to support a plurality of axially alined blanks, a tap having a shank adapted to project through said blanks and to be supported thereby, a spindle having a chuck, a raceway arranged to deliver blanks to said guideway, a feeding pusher arranged to feed a blank toward said chuck and thereby present the blank to the tap and insert the tap in the chuck, and a pusher for ejecting the tap from the chuck to permit the discharge of a tapped blank from the rear or shank end of the tap.

12. A tapping machine comprising a guideway arranged to support a plurality of axially alined blanks, a tap having a shank adapted to project through said blanks and to be supported thereby, a spindle having a chuck, a raceway arranged to deliver blanks to said guideway, a feeding pusher arranged to feed a blank toward said chuck and thereby present the blank to the tap and insert the tap in the chuck, a pusher for ejecting the tap from the chuck to permit the discharge of a tapped blank from the rear or shank end of the tap, and a reciprocatory frame for actuating said pushers.

13. A tapping machine comprising a horizontally arranged hollow spindle having a chuck, a rectilinear tap adapted to project through and be supported by a plurality of tapped blanks, a pusher arranged to project through said spindle to engage and eject the tap from the chuck to permit the discharge of a tapped blank from the rear end of the tap, a longitudinal guideway for holding a series of tapped blanks and thereby supporting said tap when it has thus been ejected from the chuck, means for returning the tap into engagement with the chuck, and a device for intermittently holding said tap against movement away from said chuck.

14. A tapping machine comprising a plurality of bars forming a guideway for a series of blanks and arranged to prevent rotation of said blanks, a tap alined with said guideway and arranged to extend through a plurality of tapped blanks thereon, a spindle, means for ejecting said tap and spacing it from said spindle to permit the discharge of a spaced blank from the rear end of said tap, and means for returning said tap into engagement with the spindle and feeding a blank to the tap.

15. A tapping machine comprising a plurality of bars forming a guideway for a series of blanks and arranged to prevent rotation of said blanks, a tap alined with said guideway and arranged to extend through a plurality of tapped blanks thereon, a spindle, means for ejecting said tap and spacing it from said spindle to permit the discharge of a spaced blank from the rear end of said tap, means for returning said tap into engagement with the spindle and feeding a blank to the tap, and means for rotating said spindle whereby, when the tap is engaged therewith and rotated thereby, the said last-mentioned blank will be fed along said tap by the action of the cutters thereof on said blank.

16. A nut tapping machine comprising a raceway for the blanks, a guideway arranged to receive the blanks therefrom, a blank-feeding pusher for feeding the blanks from said raceway along the guideway, a tap, and a pin on the pusher to engage the end of said tap.

17. A nut tapping machine comprising a spindle, a chuck thereon, a tap movable axially into and out of engagement with the chuck, means for supplying blanks to said tap to be threaded, a pin in axial alinement with the tap, and means for moving said pin into engagement with said tap to hold it in the chuck.

18. A nut tapping machine comprising a spindle, a chuck thereon, a tap movable axially into and out of engagement with the chuck, means for supplying blanks to said tap to be threaded, consisting of a hollow pusher arranged to feed a blank longitudinally of the tap, and a stop pin arranged in the pusher to engage the end of the tap and maintain it in the chuck.

19. A nut tapping machine comprising a spindle at one end, a raceway for blanks at the other end, a tap adapted to be engaged with and separated from the spindle, a pusher frame adapted to reciprocate longitudinally of the tap, a pusher at one end of the frame for separating the tap axially from the spindle, and a pusher at the other end of the frame for feeding a blank from the raceway to the tap and returning the tap into engagement with the spindle.

20. A tapping machine comprising a main frame, a plurality of independent unitary tapping mechanisms thereon, each constructed and arranged simultaneously to tap a plurality of blanks, and a common driving element for all of said unitary tapping mechanisms.

21. A tapping mechanism comprising a plurality of tap-driving spindles, a plurality of taps, a pusher frame, and means on said frame for intermittently separating said taps from their respective spindles and returning them into engagement therewith.

22. A tapping mechanism comprising a plurality of tap-driving spindles, a plurality of taps, a plurality of raceways, a movable frame, and means on said frame for supplying blanks from said raceways to said taps and for disengaging said taps from their respective spindles.

23. A tapping mechanism comprising a plurality of tap-driving spindles, a plurality of taps, a plurality of raceways, a movable frame, means on said frame for supplying blanks from said raceway to said taps and for disengaging said taps from their respective spindles, and a feed mechanism for said movable frame.

In testimony whereof I have affixed my signature.

FRANK L. CONE.